United States Patent
Briggs et al.

(10) Patent No.: US 6,352,387 B1
(45) Date of Patent: Mar. 5, 2002

(54) RECIRCULATION-ENHANCED SUBSURFACE REAGENT DELIVERY SYSTEM

(76) Inventors: Robert A. Briggs, 13103 Blue Willow Pl.; S. Robert Steele, II, 13114 Blue Willow Pl., both of Clifton, VA (US) 20124

( * ) Notice: Subject to any disclaimer, the term of this patent is extended or adjusted under 35 U.S.C. 154(b) by 0 days.

(21) Appl. No.: 09/453,056

(22) Filed: Dec. 2, 1999

(51) Int. Cl.[7] .............................. B09C 1/02; B09C 1/08; C02F 3/02
(52) U.S. Cl. ................. 405/128.25; 166/306; 166/370; 166/371; 166/372; 166/90.1; 210/170; 210/747; 210/759; 210/760; 405/128.45; 405/128.5
(58) Field of Search .................. 166/68, 90.1, 306, 166/310, 369, 370, 371, 372; 201/170, 747, 758, 759, 760; 405/128.25, 128.45, 128.5; 588/205, 228, 249

(56) References Cited

U.S. PATENT DOCUMENTS

| | | | |
|---|---|---|---|
| 3,335,791 A | * 8/1967 | Patton | 210/747 |
| 4,591,443 A | 5/1986 | Brown et al. | 210/747 |
| 5,095,975 A | * 3/1992 | Bernhardt | 166/370 X |
| 5,171,104 A | * 12/1992 | Bernhardt | 405/128.45 X |
| 5,180,503 A | 1/1993 | Gorelick et al. | 210/758 |
| 5,286,141 A | 2/1994 | Vigneri | |
| 5,302,286 A | * 4/1994 | Semprini et al. | 201/747 X |
| 5,318,698 A | * 6/1994 | Bernhardt | 405/128.25 X |
| 5,343,941 A | * 9/1994 | Raybon | 166/90.1 X |
| 5,389,267 A | 2/1995 | Gorelick et al. | 210/758 |
| 5,398,757 A | * 3/1995 | Corte et al. | 210/747 X |
| 5,425,598 A | 6/1995 | Pennington | |
| 5,464,309 A | * 11/1995 | Mancini et al. | 405/128.25 |
| 5,611,642 A | 3/1997 | Wilson | 166/278 X |
| 5,741,427 A | 4/1998 | Watts et al. | 210/747 |
| 5,879,108 A | * 3/1999 | Haddad | 166/306 X |
| 6,019,548 A | * 2/2000 | Hoag et al. | 210/747 X |
| 6,083,407 A | * 7/2000 | Kefoot | 210/747 |
| 6,158,924 A | * 12/2000 | Athens et al. | 166/90.1 X |
| 6,174,108 B1 | * 1/2001 | Suthersan | 210/747 X |
| 6,190,092 B1 | * 2/2001 | Miller | 210/747 X |

* cited by examiner

Primary Examiner—George Suchfield
(74) Attorney, Agent, or Firm—Dowell & Dowell, P.C.

(57) ABSTRACT

Method and apparatus for delivery of chemical reagents to a subterranean body of soil and groundwater to destroy or enhance mobility of organic compounds using a riser insertable in a borehole having spaced permeable sections separated by a non-permeable section and wherein the reagents are introduced from a source by a pressurization apparatus.

8 Claims, 2 Drawing Sheets

RECIRCULATION-ENHANCED SUBSURFACE REAGENT DELIVERY SYSTEM

BACKGROUND OF THE INVENTION

1. Field of the Invention

The present invention relates, in general, to the remediation of contaminated soil and groundwater. It relates to an in situ method and apparatus to deliver chemical reagents that serve to degrade and/or enhance recovery of organic contamination in soil and groundwater.

2. History of the Related Art

Contamination of subsurface soil and groundwater from the release of hazardous substances has become a significant problem in populated and industrialized areas of the world. The contamination stems from intentional or unintentional releases of hazardous substances from above- and below-ground storage vessels such as tanks and conveyance piping, materials handling practices such as degreasing and other cleaning operations, and other product transfer operations. The released products that are in themselves hazardous or contain hazardous constituents include: petroleum products such as gasoline, diesel fuel, heating oil, jet fuel, and a variety of lubricants; halogenated solvents such as perchloroethylene, trichloroethylene, and freons; and non-halogenated solvents such as hexane, benzene, and ether.

The releases of these substances to the ground surface or into the subsurface presents a risk of human exposure that is unacceptable for human health and ecological factors. Many of the contaminants are known carcinogens and excessive exposure to them has been shown to increase the probability of contracting certain diseases including various forms of cancer. Potential human exposure routes include: inhalation of the volatile contaminant species which can occur as the contaminants in soil and groundwater evaporate into breathing zones; incidental ingestion of contaminated soil; and ingestion of or dermal contact with contaminated groundwater from a potable drinking water well. In response to these concerns, federal, state, and local governments have enacted environmental legislation requiring property owners to investigate and remediate their properties that contain contaminated soil and/or groundwater.

Many techniques have been developed and used over the past two decades to remove or destroy contaminants in soils and groundwater. Early forms of remediation included excavation of contaminated soil for landfill disposal and extraction of contaminated groundwater from wells, above ground treatment followed by discharge to a sewer system or reapplication at the subsurface. Because these methods generally involved substantial financial expenditure and were mostly ineffective, more advanced, in situ methods and techniques of treatment have been developed. These in situ methods include bioremediation, surfactant flushing, and chemical oxidation.

Bioremediation techniques rely on the stimulation of naturally-occurring subsurface bacteria or augmentation with foreign bacteria that, in turn, metabolize the subsurface organic contamination thereby reducing the concentration of the contaminant in soils and groundwater. The effectiveness of in situ bioremediation techniques relies on the uniform and comprehensive delivery of reagents such as inorganic nutrients, oxygen, and bacteria to the region of the subsurface targeted for treatment. Typically, reagent delivery has been accomplished through wells, irrigation trenches, injection lances, or french drains, all of which are established by prior art. Through numerous applications of bioremediation techniques at contaminated sites, it has been shown that these means to deliver reagents do not provide an effective system to supply the necessary reagent flow. Further, each well can reach only a limited volume of soil and groundwater, and, therefore, a large number of the wells, trenches, etc., must be emplaced at a site in order to address an entire contaminated soil or groundwater volume.

Surfactant flushing techniques rely on the delivery of a reagent to the subsurface that serves to reduce the surface tension of organic contaminants which are adhered to soil particle surfaces (commonly referred to as "adsorbed contamination") or trapped in the interstitial spaces between soil particles (commonly referred to as "absorbed contamination"). When the delivered chemical reagent (surfactant) contacts the absorbed or adsorbed contaminants (collectively referred to as "sorbed contaminants") the sorption forces are reduced, thereby increasing the mobility of the contaminant which, in turn, increases its ability to be collected and extracted by groundwater extraction (pumping) techniques. Once again, effective application of this technique relies heavily on the delivery device since the surfactant reagent must contact all portions of the soil and groundwater volume that contains the organic contaminant. As with other in situ techniques, surfactant flushing relies on conventional chemical reagent delivery devices such as wells, trenches, injection lances, and french drains to effect emplacement of the surfactant solution. Experience with these devices has again demonstrated that their ability to effect reagent delivery to any significant volume of soil or groundwater surrounding the device is limited since they rely solely on gravitational forces, which may be enhanced by pressurizing the reagent fluid. These apparatus do not promote mixing and turbulence needed to adequately disperse the reagent fluid.

Similarly, chemical oxidation techniques using hydrogen peroxide, Fenton's Reagent (a combination of hydrogen peroxide, acid, and metal salts) as discussed in Hawley's Condensed Chemical Dictionary, $11^{th}$ Edition, Van Nostrand Reinhold, Publishers, 1987, potassium permanganate, sodium permanganate, and ozone rely on the delivery of reagents to the subsurface using wells, trenches, injection lances, or french drains. In addition to their limited effectiveness in comprehensively and economically delivering the required reagents, the use of these conventional delivery techniques can result in dangerous pressure buildup within these devices because of the pressure and heat generated by the reactions that result from chemical oxidation of the contaminants by the supplied oxidation reagents. Generally, a substantial quantity of the oxidizing fluid, in relatively high concentrations (15% to 50% by weight in aqueous form) is needed to effect the desired decomposition of the organic contaminants. Experience with the application of these quantities and concentrations of oxidizing fluids has shown that undesired consequences occur. For example, without adequate dispersement of the reagents from the application apparatus into the surrounding soil and groundwater matrix, the oxidizing fluid can: (1) react with itself, producing large quantities of oxygen gas, which, in combination with the vaporized organic constituent, produce dangerous, explosive conditions; (2) lead to inefficient use of the oxidizing solution; and (3) can cause runaway overpressurization of the apparatus leading to sudden blowout of the apparatus, its components, and/or soil and groundwater surrounding the apparatus.

SUMMARY OF THE INVENTION

The present invention relates to an apparatus to effectively deliver chemical reagents to the subterranean environment in a uniform, comprehensive manner, to enhance mixing and lateral and vertical dispersion of the reagents to the soil and groundwater surrounding the apparatus. The chemical reagents delivered by the apparatus include those capable of oxidizing, degrading, or enhancing solubility and mobility organic contaminants sorbed to soils or dissolved in groundwater. The method and apparatus which comprises the present invention accomplishes remediation of soil and groundwater contaminated with undesirable organic compounds by overcoming deficiencies in the art with respect to the delivery of the reagents needed to bring about oxidation, degradation, or solubility and mobility enhancement.

The invention method includes the installation of a plurality of recirculating reagent delivery devices or wells into the subsurface, injection of select chemical reagents into each of the recirculating wells, and recirculation of the reagent/groundwater mixture between the recirculating reagent delivery device and the surrounding soil/groundwater matrix to enhance distribution and mixing of the reagent/groundwater mixture. The apparatus associated with the present invention is the recirculating reagent delivery device. The device consists of: a borehole extending vertically into the subterranean strata; a cylindrical casing centered within the borehole and extending from the ground surface to near the bottom of the borehole; a perforated or screened (permeable) section of the cylindrical casing located near the bottom of the casing to allow reagents to flow outward from the casing or allow groundwater to flow into the casing; a second permeable section of the cylindrical casing located above the lower permeable section to allow either groundwater to flow into the casing or allow supplied reagents to flow out of the casing into the surrounding groundwater body; a reagent delivery string located within the casing and extending to either the upper or lower permeable sections of the cylindrical casing; and reagent mixing, storage, and supply equipment located at the ground surface and attached to the reagent delivery string.

There are two forms of the device in order to address organic contaminants that are denser than groundwater, known as dense, non-aqueous-phase liquids (DNAPL), and organic contaminants that are less dense than groundwater, known as light, non-aqueous-phase liquids (LNAPL). The design of each form of the device (the forced mode and the lift mode, respectively) allows for delivery of the reagents to the region of the groundwater body that is likely to contain a greater concentration or mass of the contaminant. Specifically, the forced mode form of the device is designed to deliver reagents to a greater depth while receiving groundwater for recirculation from a shallow depth because DNAPL contaminants tend to sink, or migrate downward, to greater depths of the groundwater body. Conversely, the lift mode of the device, constructed and operated to address LNAPL contaminants, delivers reagents to the upper portion of the groundwater body, while receiving groundwater from the deeper portion of the groundwater body for recirculation.

The forced mode form of the device is designed and constructed such that the upper and lower permeable sections of the casing are separated by a pump. Groundwater enters the casing through the upper permeable section and is forced by the pump through the lower permeable section and into the groundwater body surrounding the lower permeable section. Reagents are added to the groundwater at the discharge end of the pump through a reagent feed string so that they, in addition to the groundwater, are delivered to the groundwater body surrounding the lower permeable section of the casing.

The lift form of the device is designed and constructed such that the reagent feed string extends to the top of the lower permeable section. Reagents, such as potassium permanganate, Fenton's Reagent, hydrogen peroxide, ozone, surfactants, or biological nutrients, are pumped into the reagent delivery string, along with a transport medium such as water or compressed air, and emerge in the cylindrical casing, react with dissolved organic contaminants in the groundwater causing gas to form (or, in the case of surfactant, nutrient, or ozone reagents, the supplied air) lifting the fluid in the casing to the upper screened or permeable area, causing the fluid/gas mixture to emerge from the upper portion of the casing and into the surrounding soil/groundwater matrix. The loss of the fluid from the casing allows additional groundwater to flow into the lower screened or permeable section establishing the circulation process which continues as long as reagents are added through the string. The downward motion of the fluid emerging from the upper screen, coupled with the inward motion of groundwater being drawn into the lower screen, creates a torroidal circulation pattern which serves to enhance mixing, reagent distribution, and sorbed contaminant dissolution.

The chemical reactions associated with the use of oxidation reagents, in particular, can generate heat and unwanted vapor containing volatile species of organic contaminants. In cases when this vapor generation is likely (when volatile organic species are present in the groundwater), a vacuum can be applied to the cylindrical casing by a vacuum pump so that the vapor can be evacuated and either discharged to the atmosphere or can be treated with conventional vapor treatment techniques (carbon adsorption, catalytic oxidation, and the like) prior to atmospheric discharge. The applied vacuum also serves to reduce pressures within the freeboard region of the cylindrical casing and within the soils surrounding the device above the groundwater table. The pressure reduction reduces the danger of eruptions of soils and delivery system components that have been experienced by others practicing in situ chemical oxidation procedures using wells, injection lances, trenches, and french drains.

BRIEF DESCRIPTION OF THE DRAWINGS

The principles of the present invention can be readily illustrated by the accompanying drawings together with the detailed description that follows and wherein:

FIG. 1 is a cross-sectional view of the recirculation-enhanced reagent delivery system in lift mode; and.

DESCRIPTION OF THE PREFERRED EMBODIMENT

Figure 1:
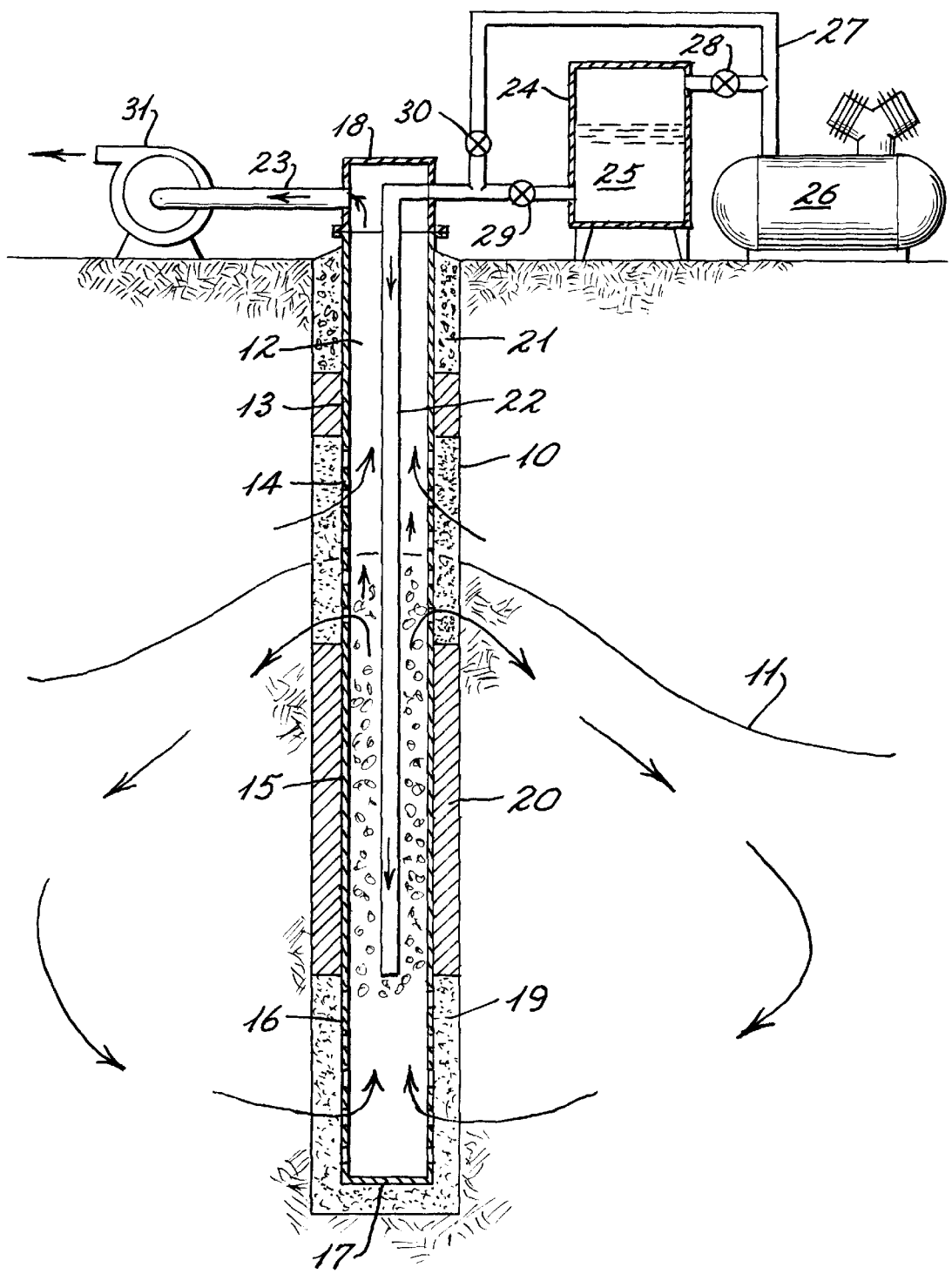
Figure 2:
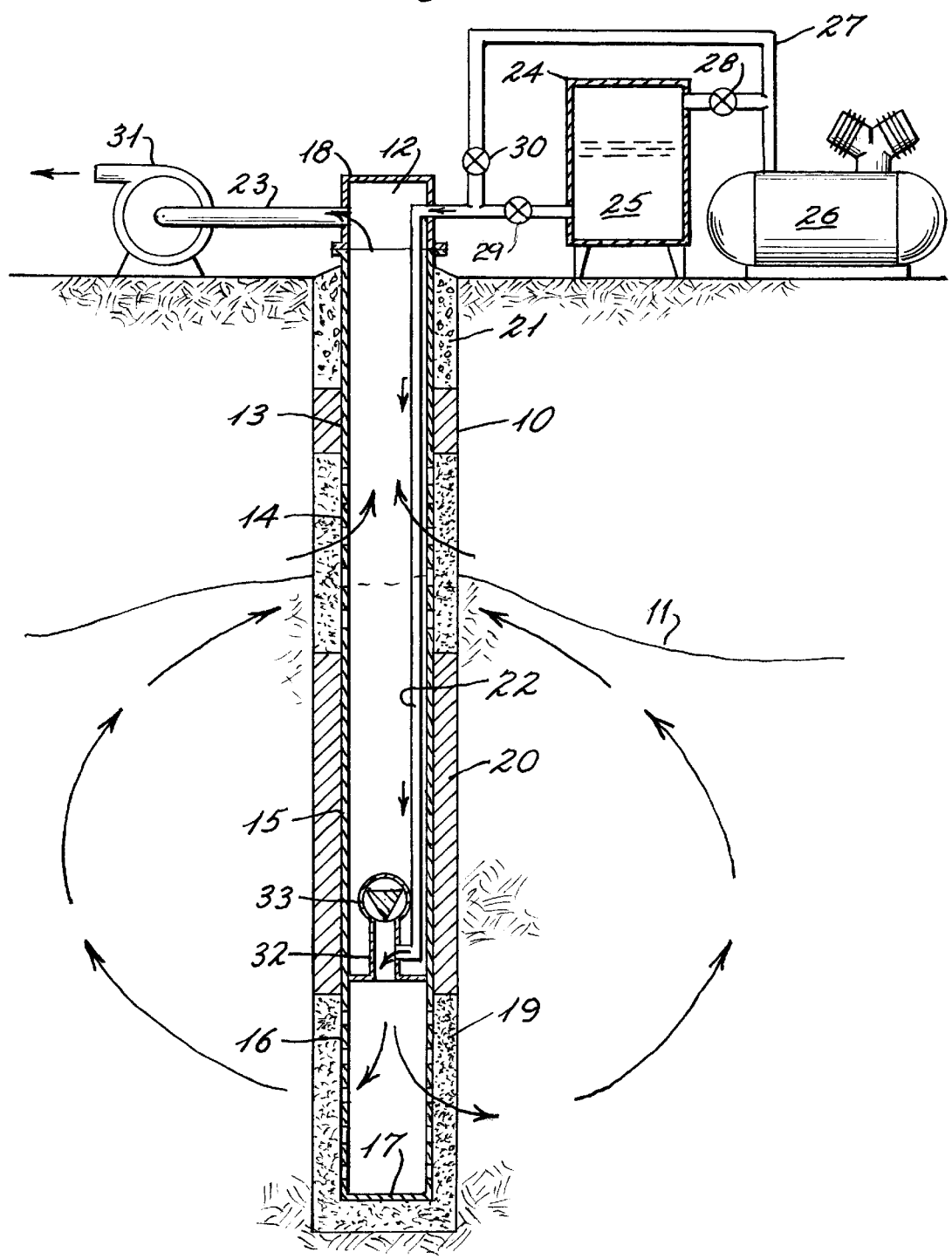
FIG. 2 is a cross-sectional view of the recirculation-enhanced reagent delivery system in force mode.

FIGS. 1 and 2 show the cross-section of the two forms of the recirculation-enhanced reagent delivery device in lift mode form for application to organic contamination that is less dense than groundwater and the force mode form for application to organic contaminants that are denser than groundwater, respectively.

The following description relates to construction of both forms of the device as shown in FIGS. 1 and 2. Common to both forms of the device is the emplacement of a vertical borehole 10 by drilling methods well known in the current art. Borehole 10 extends to below groundwater table surface 11 to a depth below the level of organic contamination that is desired to be addressed by the device. Delivery system riser 12 is inserted and centered in borehole 10. Delivery system riser 12 consists of the following tubular sections with a diameter less than that of borehole 10: impermeable riser sections 13 and 15; permeable riser sections 14 and 16; impermeable end cap 17; and riser head assembly 18.

Annular space between borehole 10 and riser 12 is filled with filter material 19, sealing material 20, and stabilization material 21. Filter material 19 is installed in the annular space from the bottom of borehole 10 to a depth near the top of the permeable riser section 16 and between the depths approximately coinciding with permeable riser section 14. Filter material 19 can be any permeable material (such as sand or gravel) that retains or restricts the transport of fine particulates. Sealing material 20 is installed in the annular space between the depths coinciding with the bottom portion of impermeable riser section 13 and between the depths coinciding with impermeable riser section 15. Sealing material can be any impermeable material that can provide a liquid-tight seal between borehole 10 and impermeable riser sections 13 and 15 such as bentonite or a bentonite-cement mixture. Stabilization material 21 is installed in the remaining annular space between borehole 10, impermeable riser section 13, and the top of sealing material 20. Stabilization material can be any load-bearing material (such as cement or concrete) that restricts lateral movement of riser 12 within borehole 10.

The following description relates to the construction and operation of the lift form of the device as shown in FIG. 1. Riser head assembly 18 and end cap 17 are affixed to the top and bottom of riser 12, respectively. Assembly 18 and end cap 17 restrict permeability of riser 12 to only permeable riser sections 14 and 16, reagent delivery string 22, and gas collection vent 23. Reagent delivery string 22 is a tubular material of less diameter than riser 12, passes from the ground surface through head assembly 18, and extends to a depth coinciding approximately with the bottom of impermeable riser section 15. Reagent delivery string 22 is attached to reagent supply vessel 24 which contains reagent solution 25. Supply vessel 24 is attached to an air pump or compressor 26 by an air supply line 27. Air supply line 27 includes a branch connection that is also attached to reagent delivery string 22. In this configuration, air pump 26 can supply compressed air either to reagent supply vessel 24 for pressurized delivery of reagents to reagent delivery string 22 or deliver compressed air directly to reagent delivery string 22. The selection of compressed air delivery is made by manipulation of flow control valves 28, 29, and 30. For delivery of reagents to reagent delivery string 22, control valves 28 and 29 are in the open or throttled position while control valve 30 is in the closed position. Conversely, for delivery of compressed air directly to the reagent delivery string, control valves 28 and 29 are closed while control valve 30 is open or throttled. Gas collection vent 23 is attached to riser head assembly 18 which is attached to ventilation pump 31 which may ventilate gas to the atmosphere or may attach to subsequent treatment equipment commonly known and described in the prior art.

Operation of the lift form of the device is first accomplished by adding reagent solution 25 to reagent supply vessel 24. Reagent solution 25 may be aqueous solutions, including: acids, metal salt solutions (such as ferrous sulfate), and peroxides that comprise a Fenton's Reagent application; permanganate solutions for direct oxidation of organic contaminants in the groundwater; or surfactant solutions to enhance desorption and dissolution of organic contaminants sorbed to soils surrounding the borehole. Reagent solution 25 may be a gaseous solution such as ozone, oxygen, or a mixture thereof, in which case reagent supply vessel 24 would be a ozone and/or oxygen generation device commonly known and described in the prior art. The utilization of the reagent delivery device may include some or all of these reagents added simultaneously or in series in order to accomplish the desired organic contaminant destruction or removal.

After reagent solution 25 has been added to reagent supply vessel 24, operation of the lift form of the device is continued by providing compressed air directly to reagent delivery string 22 to establish groundwater circulation. Compressed air emerges from the end of reagent delivery string 22 and flows upward by gravitational forces within groundwater contained in riser 12, increasing height of fluid/air column within riser 12. Groundwater/air mixture then passes out of riser 12 through permeable riser section 14. The corresponding rise in height of the groundwater table surface 11 causes additional groundwater to flow toward and into riser 12 through permeable riser 16. The resulting flow out of riser 12 through permeable riser section 14 and into riser 12 through permeable riser section 16 causes a torroidal, recirculation pattern to develop in the groundwater body surrounding borehole 10 as desired and contemplated by this invention. Compressed air that emerges from the groundwater/air mixture in riser 12 near permeable riser section 14 can pass upward and out of riser 12 through gas collection vent 23. Because organic contamination that is volatile will tend to be transferred from groundwater into the compressed air steam as it passes through impermeable riser section 15, the air stream emerging from vent 23 may require collection and treatment. In these cases, the device is equipped with standard vapor treatment equipment such as granular activated carbon, catalytic oxidation, or other techniques described in the prior art.

With the groundwater recirculation patterns fully developed through the addition of compressed air to reagent delivery string 22, valves 28, 29, and 30 are manipulated such that compressed air flow is to reagent supply vessel 24, causing reagent solution 25 to flow through reagent supply string 22 for a time period sufficient to delivery the contents of vessel 24. Control valves 28, 29, and 30 are manipulated to allow compressed air to flow to reagent delivery string 22 and effect circulation of previously supplied reagents into the groundwater body surrounding borehole 10. This procedure continues until all the desired reagent solutions and solution volumes have been delivered.

The following description relates to the construction and operation of the force mode of the reagent delivery device. As shown in FIG. 2, the construction of the force mode form differs from the lift mode form with installation of reagent mixing chamber 32 and force pump 33. Chamber 32 serves to: provide hydraulic separation between permeable riser sections 14 and 16; connect the outlet of reagent delivery string 22, and provide a connection for force pump 33. Force pump 33 accepts groundwater that enters riser 12 through permeable riser section 14 and increases its pressure such that it is forced, along with the liquid or gaseous reagents 25 supplied through reagent delivery string 22, out of riser 12 through permeable riser section 16. Operation of the force mode of the reagent delivery device is similar to that of the lift mode except that the roles of the permeable riser sections are reversed, resulting in the groundwater/reagent mixture being forced out of riser 12 through permeable riser section 16 and groundwater to flow into riser 12 through permeable riser section 14.

Using the procedures and apparatus of the invention, subsurface areas of up to approximately fifty feet from the borehole may be treated.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

We claim:

1. A subterranean, recirculation-enhanced reagent delivery apparatus for treatment of organic contamination located below the ground surface, comprising:

a riser adapted to be placed within a borehole, said riser including an upper and a lower fluid permeable riser section which are separated by a fluid impermeable riser section;

means for injecting liquid and gaseous chemical reagents to cause said reagents to be mixed with groundwater entering one of said upper and lower permeable riser sections, dispersed from the other of said upper and lower permeable riser sections, and mixed within a region surrounding the borehole so that said reagents cause oxidation of organic contaminants in soil and groundwater surrounding the borehole, and wherein the chemical regents are selected from a group of aqueous solutions consisting of acids, metal salts, peroxides to initiate a Fenton Reation, potassium permanganate and solium permanganate, surfactants and ozone.

2. The apparatus of claim 1 wherein said means for injecting includes a pump and a reagent storage tank, means for selectively connecting said pump in flow communication with said storage tank and means for communicating said storage tank through said riser to an area of said lower permeable riser section.

3. The apparatus of claim 2 wherein said pump is located between said upper and lower permeable riser sections.

4. A method of claim 1 wherein chemical reagents include combinations with oxygen.

5. A method for treatment of organic contamination below the ground surface using a riser having spaced permeable sections separated by a non-permeable section, comprising the steps of:

a) forming a borehole and placing the riser therein;

b) providing a source of fluid reagent which can effect oxidation of organic contaminants in soil and groundwater;

c) injecting said fluid reagent into the riser to thereby mix with groundwater entering through one of said spaced permeable sections and to create a flow through an area surrounding the borehole and to the other of the spaced permeable sections to thereby effect destruction or enhanced mobility of organic contaminates in soil and groundwater surrounding the borehole, and the reagent being selected from a group consisting of aqueous solutions of acids, metal salts, peroxides to initiate a Fenton Reaction, surfactants potassium permanganate and sodium permanganate, ozone and combinations thereof, including combinations with oxygen.

6. A method for treatment of organic contamination below the ground surface using a riser having spaced permeable sections separated by a non-permeable section, comprising the steps of:

a) forming a borehole and placing the riser therein;

b) providing a source of fluid reagents which can effect destruction or enhanced mobility of organic contaminants in soil and groundwater and wherein the chemical reagent includes aqueous solutions of acids, metal salts, and peroxides to initiate a Fenton Reaction;

c) injecting said chemical reagent into the riser to thereby mix with groundwater entering through one of said spaced permeable sections and to create a flow through an area surrounding the borehole and to the other of the spaced permeable sections to thereby effect destruction or enhanced mobility of organic contaminates in soil and groundwater surrounding the borehole.

7. A method for treatment of organic contamination below the ground surface using a riser having spaced permeable sections separated by a non-permeable section, comprising the steps of:

a) forming a borehole and placing the riser therein;

b) providing a source of fluid reagents which can effect destruction or enhanced mobility of organic contaminants in soil and groundwater and wherein the chemical reagent includes aqueous solutions selected from solutions of potassium permanganate and sodium permanganate;

c) injecting said chemical reagent into the riser to thereby mix with groundwater entering through one of said spaced permeable sections and to create a flow through an area surrounding the borehole and to the other of the spaced permeable sections to thereby effect destruction or enhanced mobility of organic contaminates in soil and groundwater surrounding the borehole.

8. A method for treatment of organic contamination below the ground surface using a riser having spaced permeable sections separated by a non-permeable section, comprising the steps of:

a) forming a borehole and placing the riser therein;

b) providing a source of fluid reagents which can effect destruction or enhanced mobility of organic contaminants in soil and groundwater and wherein the fluid reagent includes a surfactant;

c) injecting the fluid reagent into the riser to thereby mix with groundwater entering through one of said spaced preamble sections and to create a flow through an area surrounding the borehole and to the other of the spaced permeable sections to thereby effect destruction or enhanced mobility of organic contaminates in soil and groundwater surrounding the borehole.

* * * * *